United States Patent [19]

Sekiguchi et al.

[11] 4,234,765
[45] Nov. 18, 1980

[54] KEY TELEPHONE SYSTEM

[75] Inventors: Kouichi Sekiguchi, Asaka; Hikaru Takematsu, Higashikurume; Kazutada Katsukura, Tokorozawa, all of Japan

[73] Assignee: Iwasaki Tsushinki Kabushiki Kaisha, Tokyo, Japan

[21] Appl. No.: 917,578

[22] Filed: Jun. 21, 1978

[30] Foreign Application Priority Data

Jun. 25, 1977 [JP] Japan ................................ 52-74928
Jun. 25, 1977 [JP] Japan ................................ 52-74929
Jun. 25, 1977 [JP] Japan ................................ 52-74930
Jun. 25, 1977 [JP] Japan ................................ 52-74931
Jun. 25, 1977 [JP] Japan ................................ 52-74932

[51] Int. Cl.³ ............................................. H04Q 5/18
[52] U.S. Cl. ............................. 179/99 M; 179/99 E
[58] Field of Search ................... 179/99, 18 FA, 18 J

[56] References Cited

U.S. PATENT DOCUMENTS

| Re. 29,078 | 12/1976 | Tate | 179/99 |
|---|---|---|---|
| 3,914,559 | 10/1975 | Knollman | 179/99 |
| 3,935,396 | 1/1976 | Barsellotti et al. | 179/99 |
| 4,027,110 | 5/1977 | Takematsu et al. | 179/99 |
| 4,125,749 | 11/1978 | Kinoshita et al. | 179/99 |

Primary Examiner—Gerald L. Brigance
Attorney, Agent, or Firm—Robert E. Burns; Emmanuel J. Lobato; Bruce L. Adams

[57] ABSTRACT

A key telephone system, in which a plurality of key telephone sets are selectively connected to a plurality of CO lines by the use of a plurality of talking lines under control of a key service unit and a plurality of control lines. In order to seize a CO line, a CO line seizure signal from one of key telephone sets is time-divisionally transmitted at a low speed and received by a speed change memory of the key service unit. A high-speed output from the speed change memory is added with dial or hook information and then space-divided for seizing a desired one of the CO lines. A talking operation, a holding operation, a privacy operation and a synchronizing operation in this system are performed on the base of the above operation principle.

10 Claims, 8 Drawing Figures

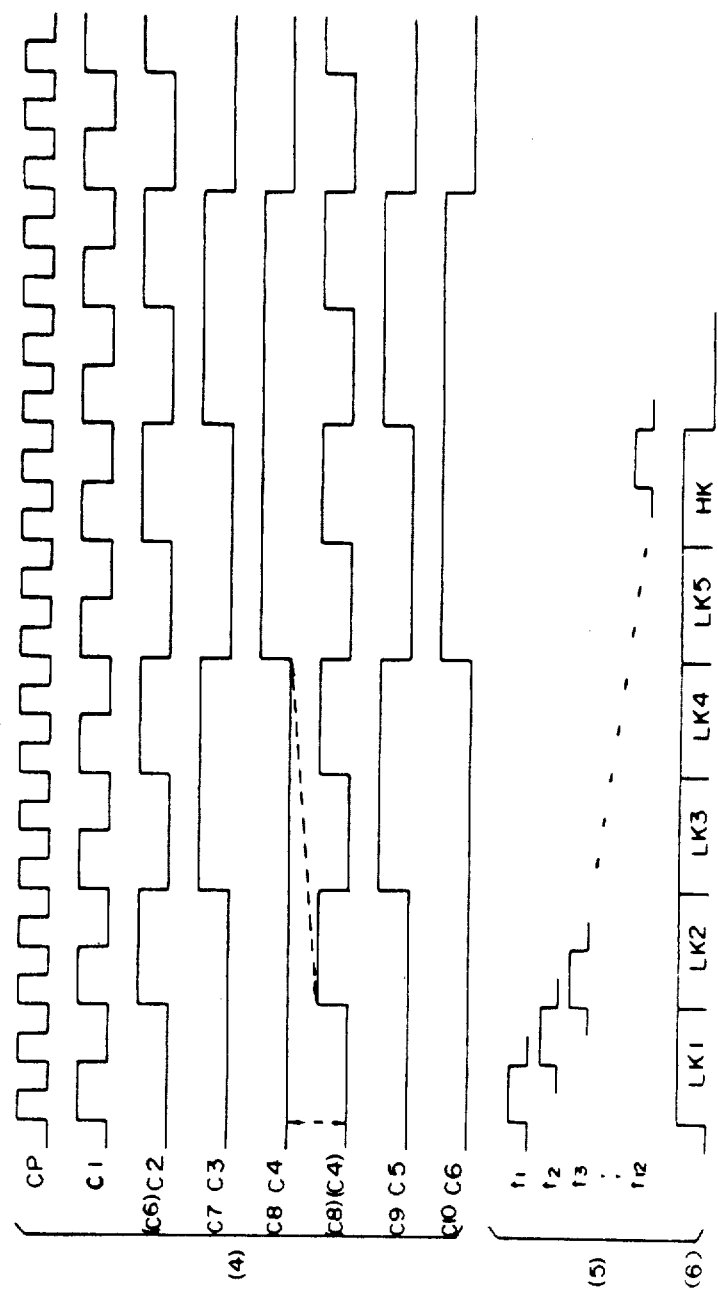

KEY TELEPHONE SYSTEM

BACKGROUND OF THE INVENTION

1. Field of the Invention

This invention relates to a key telephone system, in which a plurality of key telephone sets are selectively connected to a plurality of CO lines by the use of a plurality of talking lines under control of a key service unit and a plurality of control lines.

2. Description of the Prior Art

A conventional key telephone system has employed a cable with a large number of conductors for interconnecting a key service unit and key telephone sets. However, the system lately shows a tendency to become large-sized and multifunctional, and the costs of materials and construction are increasing, which inevitably raises the cost of the system. Accordingly, the reduction of the number of cable conductors is an effective solution for the problem of cutting costs. For decreasing the number of cable conductors, it is the practice in the art that the function of switching a CO line or a like communication line, which is achieved in the key telephone set at present, is transferred to the key service unit, as is usually seen in an exchange or the like. However, this heretofore employed method has the defect that the key service unit becomes bulky and expensive.

As regards the CO line holding operation, there has heretofore been employed means for transmitting CO line holding information by time division multiplexing between the key service unit and the key telephone set. With this method, however, holding information of one time slot is provided for each CO line, so that many time slots are needed in connection with means for transmitting the abovesaid information from the key telephone set to the key service unit. This results in raising a transmission frequency, which becomes a serious obstacle with an increase in the number of CO lines used.

Further, a privacy device of a key telephone system, heretofore employed, is packaged in the key telephone set and requires a relay contact for cutting off the communication line so as to achieve the privacy operation. This is disadvantageous for the package of the key telephone set and is an obstacle in the quality, performance, cost and maintenance of the key telephone set.

Moreover, there has heretofore been employed a method of transmitting a control signal between the key service unit and the key telephone set by the time division multiplex system, but this method requires a signal source (clock or the like) which is synchronized with both the key service unit and the key telephone set. Heretofore, there has been proposed a method in which one signal source is provided in the key service unit and a signal is transmitted therefrom to the key telephone set through a private channel, or a method in which a signal super-imposed on data is sent out to a data channel from the key service unit and only clock pulses are separated from the signal in the key telephone set. But the former requires a special cable conductor and the latter introduces complexity in the key telephone system.

SUMMARY OF THE INVENTION

An object of this invention is to provide a key telephone system which realizes an inexpensive system which is free from the abovesaid defects of the prior art and markedly reduces the number of cable conductors interconnecting the key service unit and key telephone sets.

In this invention, when to seize a CO line, a CO line seizure signal from a key telephone set is time-divisionally transmitted at a low speed and received by a speed change memory of a key service unit, and then the high-speed output therefrom is added with dial or hook information, thereafter being space-divided for seizing a desired CO line.

The above seizure operation is achieved by providing a CO line seizure circuit for a key telephone system adapted to selectively connect a plurality of key telephone sets to a plurality of CO lines by the use of a plurality of talking lines under control of a key service unit and a plurality of control lines; in which the key service unit has a first pulse generator (1, 2, 4, 5) for generating clock pulses, a plurality of trains of modulation-democulation high-speed time slot pulses respectively corresponding to the CO lines and a plurality of trains of control signal transmitting low-speed time slot pulses respectively corresponding to the control lines, a plurality of circulating memories (12, 13, 14) respectively corresponding to the key telephone sets, a plurality of write means (7, 8, 9, 10, 11, 40), each provided in correspondence to one of the key telephone sets for writing a control output transmitted from the corresponding key telephone set through the control line in a corresponding one of the circulating memories in synchronism with the AND output of a corresponding one of the plurality of trains of control signal transmitting low-speed time slot pulses and a corresponding one of the plurality of modulation-demodulation high-speed time slot pulses, a plurality of first bistable circuits (60) respectively corresponding to the plurality of CO lines, a plurality of closing means (62, 63, 64), each provided in correspondence to one of the plurality of CO lines for closing the corresponding CO line when a corresponding one of the plurality of bistable circuits is in a predetermined state, and a plurality of first gate means (56, 57, 58), each provided in correspondence to one of the plurality of CO lines for reading out the content of the plurality of circulating means in synchronism with a corresponding one of the plurality of modulation-demodulation high-speed time slot pulses to put a corresponding one of the plurality of bistable circuits in the predetermined state with the output read out of the circulating memory; in which each of the key telephone sets has a second pulse generator (26, 27, 28) for generating synchronizing time slot pulses substantially synchronized with a corresponding one of the plurality of trains of control signal transmitting low-speed time slot pulses, actuating means (33, 34) including a plurality of CO line selecting keys respectively corresponding to the CO lines, and control output means (31, 32, 36) for deriving the control output from each key telephone set with the AND output of the output from the actuating means and the synchronizing time slot pulse; and in which one of the CO lines designated by the control output sent out by the actuation of a selected one of the CO line selecting keys in a desired one of the key telephone sets is closed.

Further, it is possible to achieve a call for a CO line with DC dial impulses by providing talking current supply means (35), talking current detecting means (66) and second gate means (53).

Moreover, it is also possible to short-circuit a coil (25) during the dial pulse transmission, by connecting the coil (25) in series to the closing means (64-1) and providing a plurality of third bistable circuits (94), a plurality of short-circuit means (96-1, 96-2) and a plurality of fourth gate means (91, 92, 93), respectively corresponding to the CO lines, in the key service unit.

The above objective is also achieved by providing a talking system for a key telephone system in which a plurality of key telephone sets are selectively connected to a plurality of CO lines by the use of a plurality of talking lines under control of a key service unit and a plurality of control lines, which communication system is characterized in that the key service unit has a first pulse generator (1, 2, 4, 5) for generating clock pulses, a plurality of trains of modulation-demodulation high-speed time slot pulses respectively corresponding to the CO lines and a plurality of control signal transmitting low-speed time slot pulses respectively corresponding to the control lines, a plurality of first time-division switches (21, 22) respectively connected to the CO lines and controlled by pulse trains corresponding to the plurality of trains of modulation-demodulation high-speed time slot pulses, a plurality of second time-division switches (16, 20) respectively connected to the communication lines in correspondence to the plurality of key telephone sets and each controlled by a corresponding pulse train of modulation-demodulation high-speed time slot pulses, a plurality of circulating memories (12, 13, 14) respectively corresponding to the key telephone sets and connected at the output side to the plurality of second time-division switches, and a plurality of write means (7, 8, 9, 10, 11, 40) for writing a control output transmitted thereto from a corresponding one of the key telephone sets through the control line in a corresponding one of the plurality of circulating memories in synchronism with the plurality of trains of control signal transmitting low-speed time slot pulses; in that each of the key telephone sets has a second pulse generator (26, 27, 28) for generating synchronizing time slot pulses substantially synchronized with a corresponding one of the plurality of trains of control signal transmitting low-speed time slot pulses, actuating means (33, 34) including a plurality of CO line selecting keys respectively corresponding to the CO lines, and control output means (31, 32, 36) for deriving the control output from a corresponding one of the key telephone sets with the logical product of the output from the actuating means and the synchronizing time slot pulse; and in that one of the CO lines selected by the control output sent out by the actuation of the CO line selecting keys in a desired one of the key telephone sets is connected to the key telephone set in a time-division manner to enable a call for the selected CO line.

In this invention, when to hold a CO line, a CO line seizure signal and a piece of holding information common to all CO lines are sent out as a CO line holding signal from a key telephone set and received with a register of a key service unit in a time-division manner, thereafter being converted to holding information for each CO line. The holding information is transmitted via a transmission bus to a CO line circuit in a time-division manner and selectively received there to hold a desired CO line.

The above holding operation is achieved by providing a CO line holding circuit for a key telephone system adapted to selectively connect a plurality of key telephone sets to a plurality of CO lines by the use of a plurality of talking lines under control of a key service unit and a plurality of control lines; in which the key service unit has a first pulse generator (1, 2, 4, 5) for generating clock pulses, a plurality of trains of modulation-demodulation high-speed time slot pulses respectively corresponding to the CO lines, a plurality of trains of control signal transmitting low-speed time slot pulses respectively corresponding to the control lines, a CO line holding high-speed time slot pulse train and a CO line holding low-speed time slot pulse train, a plurality of circulating memories (12, 13 14) respectively corresponding to the key telephone sets, a plurality of first write means (10, 11, 40), each provided in correspondence to one of the key telephone sets for writing a CO line control output transmitted from the corresponding key telephone set through the control line in a corresponding one of the circulating memories in synchronism with the AND output of a corresponding one of the plurality of trains of control signal transmitting low-speed time slot pulses and a corresponding one of the plurality of trains of modulation-demodulation high-speed time slot pulses, a plurality of first bistable circuits (60) respectively corresponding to the plurality of CO lines, a plurality of second bistable circuits (61), each provided in correspondence to one of the plularity of first bistable circuits and reset by the output from the corresponding first bistable circuit, a plurality of CO line closing means (62, 63, 64), each provided in correspondence to one of the CO lines for closing the corresponding CO line when a corresponding one of the plurality of bistable circuits is in a predetermined state, a plurality of first gate means (56, 57, 58) respectively corresponding to the CO lines for establishing a corresponding one of the first bistable circuits to the predetermined state with an output read out of a corresponding one of the circulating memories in the time slot of a designated one of the plurality of trains of modulation and demodulation high-speed time slot pulses, a plurality of second write means (70, 71, 9, 10, 11, 40), each provided in correspondence to one of the key telephone sets for writing a CO line holding control output from the corresponding key telephone set in a corresponding one of the plurality of circulating memories in synchronism with the AND output of the control signal transmitting time slot pulse and the CO line holding high-speed time slot pulse, a plurality of third bistable circuits (51) respectively corresponding to the key telephone sets and set by the output read out of a corresponding one of the circulating memories in synchronism with the CO line holding high-speed time slot, a plurality of third gate means (52, 53) respectively corresponding to the key telephone sets for applying the content of a corresponding one of the plurality of circulating memories to a corresponding one of the plurality of first gate means in accordance with the state of a corresponding one of the third bistable circuits, and a plurality of second gate means (59) respectively corresponding to the CO lines for deriving an output from a corresponding one of the plurality of third gate means with a designated one of the modulation and demodulation high-speed time slot pulses to establish a corresponding one of the plurality of second bistable circuits to the predetermined state with the output read out of the third gate means; in which each of the key telephone sets has a second pulse generator (26, 27, 28) for generating synchronizing time slot pulses substantially synchronized with a corresponding one of the plurality of trains of control signal transmitting low-speed time slot pulses and a CO line holding synchronizing time slot pulse substantially synchronized with the CO line holding low-speed time slot pulse, operation means (33, 34, 73)

including a plurality of CO line selecting keys respectively corresponding to the CO lines and one CO line holding key, and holding output means ($T_{14}'$, 73, 31, 32, 36) for applying the CO line holding control output to corresponding one of the control lines in accordance with the AND output of the CO line holding synchronizing time slot pulse and the output from the CO line holding key and the AND output of an output from a designated one of the CO line selecting keys and the synchronizing time slot pulses; and in which one of the CO lines selected by the actuation of the designated one of the CO line selecting keys in a desired one of the plurality of key telephone sets is closed and held by the control of the CO line holding key.

In the present invention, the time division multiplex system is employed in control lines and talking lines of the key telephone system to reduce the number of cable conductors, and a CO line privacy circuit is packaged in the key service unit in such a manner as to directly control the time-divided lines, thereby facilitating control of the privacy circuit with an electronic circuit and reducing the privacy circuit to overcome the aforesaid defects.

The above privacy operation is achieved by providing a privacy system for a key telephone system adapted to selectively connect a plurality of key telephone sets to a plurality of CO lines by the use of a plurality of talking lines under control of a key service unit and a plurality of control lines; in which the key service unit has a first pulse generator (1, 2, 4, 5) for generating clock pulses, a plurality of trains of modulation and democulation high-speed time slot pulses respectively corresponding to the CO lines and a plurality of trains of control signal transmitting low-speed time slot pulses respectively corresponding to the control lines, a plurality of first time-division switches (21, 22) respectively connected to the plurality of CO lines and controlled by corresponding ones of the plurality of trains of modulation and demodulation high-speed time slot pulses, a plurality of second time-division switches (16, 20) respectively connected to the communication lines in correspondence to the plurality of key telephone sets and controlled by corresponding ones of the plurality of trains of modulation and demodulation high-speed time slot pulses, a plurality of circulating memories (12, 13, 14) corresponding to the key telephone sets and connected at the output side to the plurality of second time-division switches, a plurality of write means (7, 8, 9, 10, 11, 40), each provided in correspondence to one of the key telephone sets for writing a control output transmitted from the corresponding key telephone set through the control line in a corresponding one of the plurality of circulating memories in synchronism with the plurality of trains of control signal transmitting low-speed time slot pulses, a plurality of feedback means (218, 400, 216, 217, . . . ) respectively provided corresponding to the key telephone sets for temporarily inhibiting the writing of the control output in the circulating memory while an output pulse is derived from the circulating memory, and a plurality of releasing means (211), each provided in correspondence to one of the plurality of feedback means for opening a loop of the corresponding feedback means with the output pulse from a corresponding one of the plurality of circulating memories for the duration of the output pulse; in which each of the key telephone sets has a second pulse generator (26, 27, 28) for generating synchronizing time slot pulses substantially synchronized with a corresponding one of the plurality of trains of control signal transmitting low-speed time slot signals, operating means (33, 34, 73) including a plurality of CO line selecting keys respectively corresponding to the CO lines, and control output means (31, 32, 36) for deriving the control output from the corresponding key telephone set with the AND output of the output from the actuating means and the synchronizing time slot pulses; and in which one of the CO lines designated by the control output sent out by the actuation of the CO line selecting key in a desired one of the key telephone sets is connected to the key telephone sets in a time-division manner and a talking operation to the CO line is achieved in the state in which the privacy of the communication is protected from the other key telephone sets.

Further, a gate (251, 218), which is operated with a signal of a predetermined timing to inhibit the output signal from the circulating memory, is provided between the pluralities of circulating memories and feedback means, and second control means such as a privacy release key or the like is provided in each of the plurality of key telephone sets for connecting them to the CO lines. The gate is actuated by the outputs from the second pulse generator and the second actuating means to inhibit the output from the circulating memory, thereby enabling the connection of more than one of the key telephone sets to the same CO line.

In accordance with this invention, a synchronization system can be provided for a key telephone system which is constructed such that independent signal sources are repectively provided in the key service unit and the key telephone set and one of the signal sources is frequency-divided by a frequency divider, and the frequency divider is started with a clock pulse of the output from the other signal source, thereby to synchronize the clock pulses of the outputs from the both signal sources with each other.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
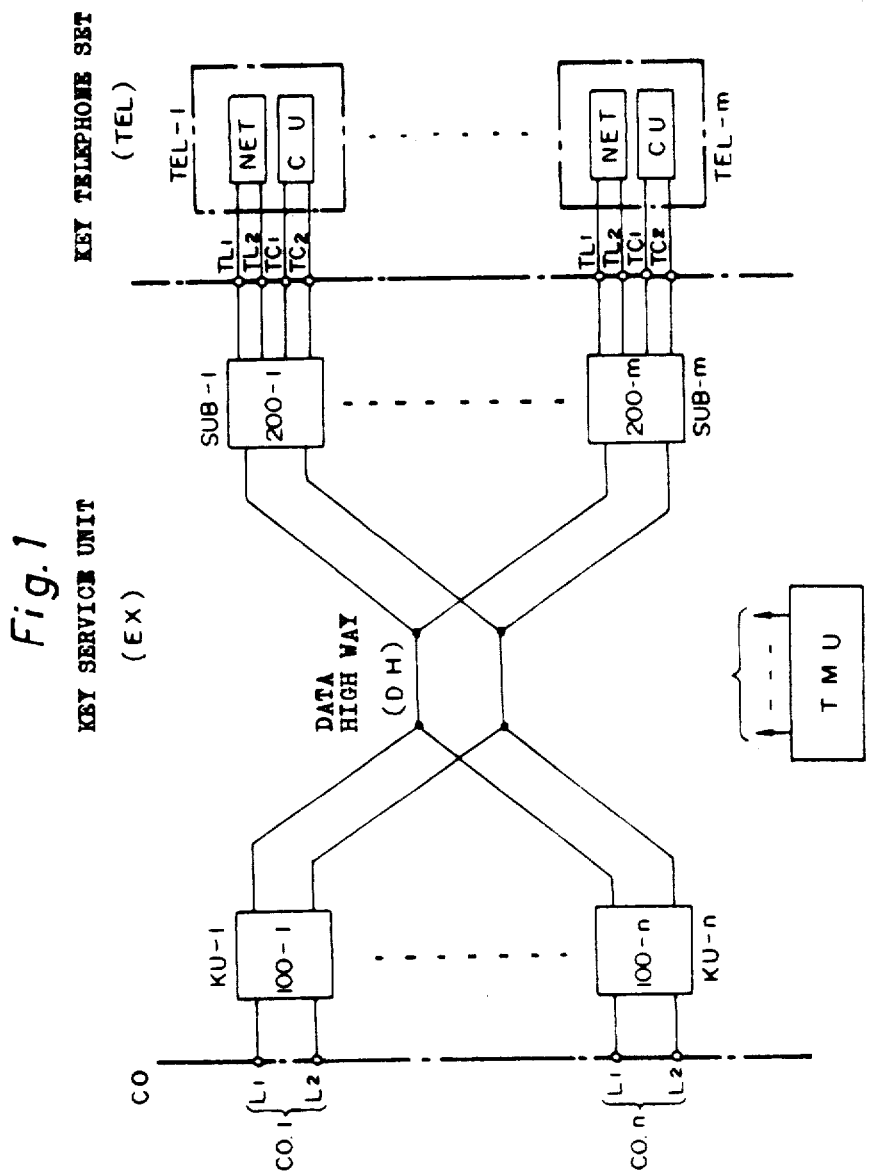
FIG. 1 is a block diagram showing the overall structure of the system of this invention.

With reference to FIG. 1, the overall structure of a key telephone system embodying this invention will first be described. CO. 1 to CO. n indicate CO lines; 100-1 to 100-n designate CO line circuits provided in correspondence to the CO lines, which circuits are respectively connected to a data highway DH. 200-1 to 200-m identify subscriber's circuits respectively connected to key telephone sets TEL-1 to TEL-m. TMU denote a common circuit which generates control signals for controlling the CO lines 100-1 to 100-n and the subscriber's circuits 200-1 to 200-m. NET and CU in each key telephone set TEL represent a talking circuit and a key telephone set control circuit, respectively.

Figure 2:
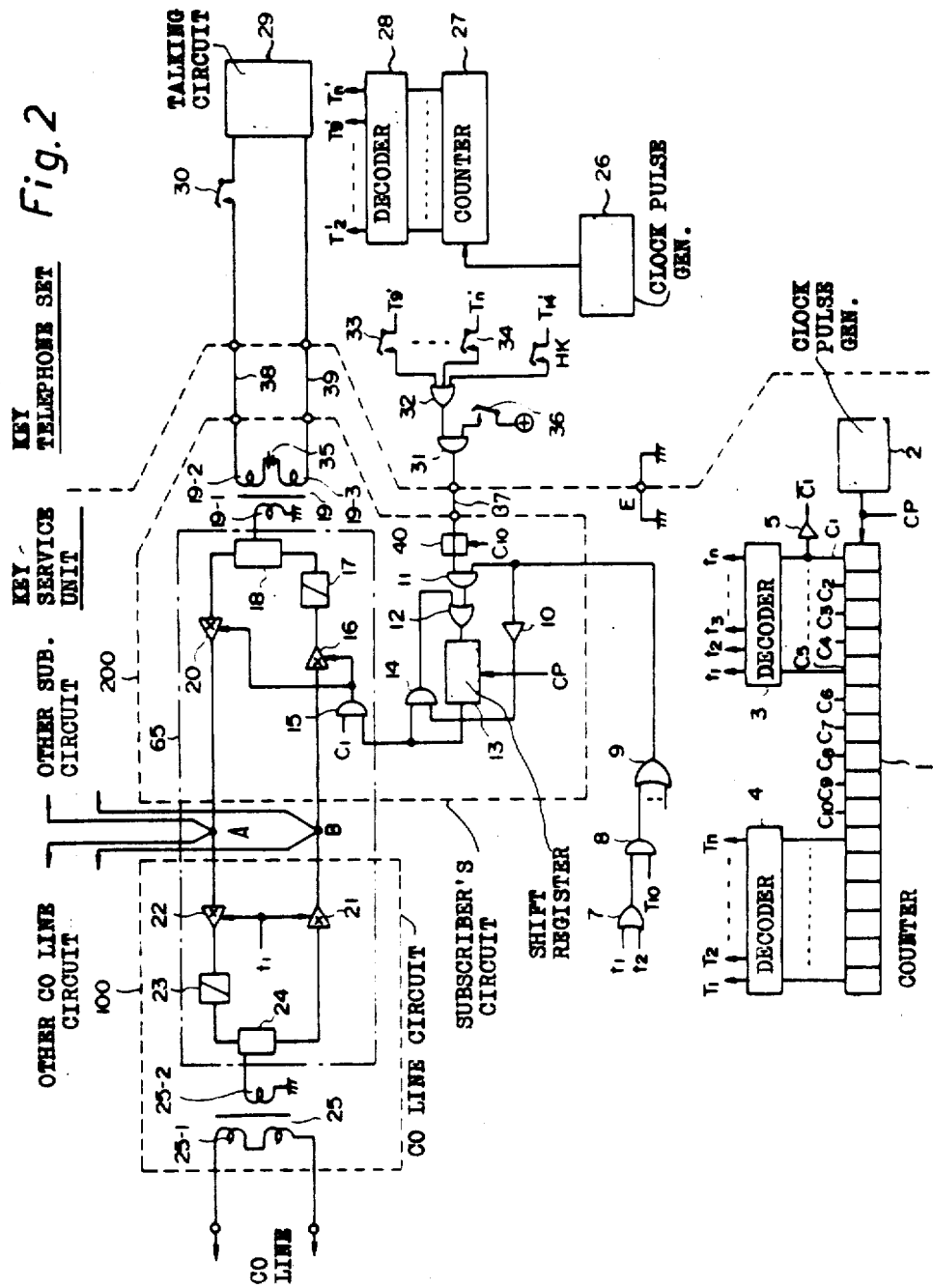
FIG. 2 is a circuit diagram explanatory of the system of this invention.
Figure 3:
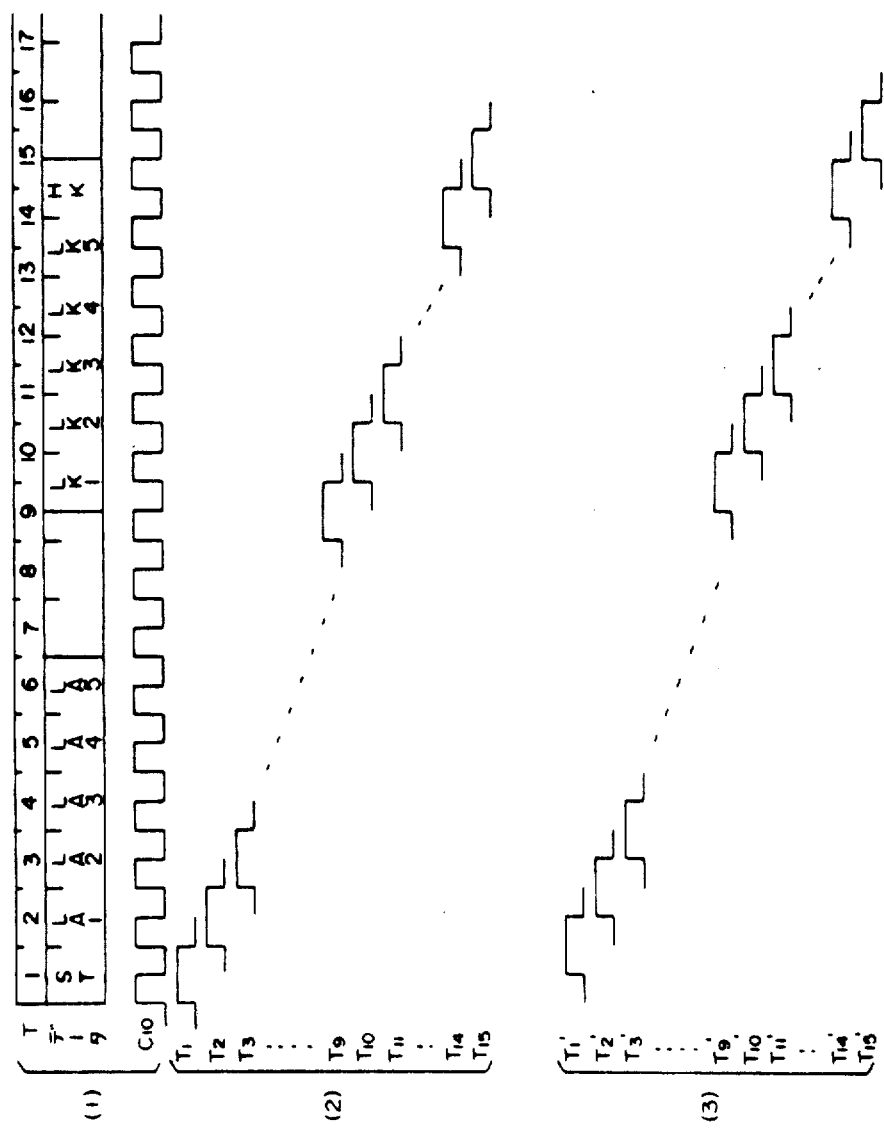
FIG. 3 shows timing charts explanatory of the operation of the system of this invention.

For giving a detailed description of the operation of this invention, a circuit diagram of the path [100-1→DH→200-1→TEL] in FIG. 1 is shown in FIGS. 2 and 3.

With reference to FIG. 2, the talking operation in this invention system will be described. Reference numerals 1 and 27 indicate counters; 2 and 26 designate clock pulse generators; 3, 4 and 28 identify decoders; 5 and 10 denote inverters; 8, 11, 14, 15 and 31 represent AND gates; 7, 9, 12 and 32 show OR gates; 13 refers to a shift register; 16, 20, 21 and 22 indicate time-fivision switches; 17 and 23 designate low-pass filters; 18 and 24 denote hybrids; 19 and 25 identify transformers; 29 denotes a talking circuit; 30 and 36 represent hook switches; 33 and 34 show contacts of CO line selecting keys; 35 refers to a power source; 37, 38 and 39 indicate cable conductors; 40 designates a flip-flop circuit; and symbols + and − show the plus (+) terminal and the minus (−) terminal of the power source. Reference 100 indentifies a CO line circuit and 200 denotes a subscriber's circuit. Pluralities of CO line circuits and subscriber's circuits are connected in parallel to each other via talking buses A and B. The plurality of CO line circuits connected in parallel have one to one correspondence to the CO lines, but the gating time slots of the time-division switches are set at different values in accordance with the respective CO lines. For instance, in FIG. 2, this time slot at one CO line is set at $t_1$, but that of another CO line is set at $t_3$ and that of the next CO line is set at $t_5$.

For convenience of description of how to actuate the abovesaid circuits, let it be assumed that the counters 1 and 27 respectively count clock pulses from the clock pulse generators 2 and 26 and are synchronized with each other. Upon depressing the CO line selecting keys after hooking off for calling a desired one of CO lines, the contacts 33 and 36 are closed. As a result of this, a timing pulse $t_9'$ included in output signals from the decoder 28, which is driven by output signals from the counter 27, is applied to the input terminal of the flip-flop 40 via a path [decoder 28→contact 33→OR gate 32→AND gate 31→cable 37→flip-flop 40]. This indicates that a signal for the CO line selection has been transmitted from the key telephone set to the key service unit. The signal thus transmitted is received by the key service unit and stored in the shift register 13.

Now, a description will be made in respect of the timing for the input operation to the shift register 13. The counter 1 is composed of a plurality of cascade-connected binary counters and driven by a clock pulse train CP derived from the clock pulse generator 2. Timing charts of outputs $C_1$ to $C_{10}$ from the counter 1 are shown in FIG. 3(4). Next, the decoders 3 and 4 are driven by the output signals from the counter 1 to obtain therefrom outputs $t_1$ to $t_n$ and $T_1$ to $T_n$, respectively. The outputs $T_1$ to $T_n$ are signals whose pulse widths are equal to the period of the output $C_{10}$ from the counter 1, as depicted in FIG. 3(2). The outputs $t_1$ to $t_n$ are signals whose pulse widths are equal to the period of the pulse train CP, as shown in FIG. 3(5), and the pulse widths of the signals $t_1$ to $t_n$ are sufficiently smaller than the pulse widths of the signals $T_1$ to $T_n$. Further, the signals $T_1'$ to $T_n'$ and $T_1$ to $T_n$ from the key telephone set have such a relationship to each other as illustrated in FIGS. 3(2) and (3), and are synchronized with each other, with a constant time lag held therebetween. FIG. 3(1) illustrates the timings of data in a case of using five CO lines. In FIG. 3(1), reference characters $LK_1$ to $LK_5$ indicate signals for the CO line selecting keys, respectively, and T shows a unit time which uses the signals $T_1$ to $T_n$ as its time slots. As is evident from FIG. 3(1), the signal $T_9'$ transmitted from the aforesaid key telephone set to the key service unit is delayed for a constant period of time relative to the signal $T_9$. This delay is to correct the step out between the counters 1 and 27 by receiving the above signal in the vicinity of the center of its pulse width in the key service unit.

In FIG. 2, the flip-flop 40 is of the type which produces an output upon rising of the gate pulse 40. Then, upon application of the input signal $T_9'$, the flip-flop 40 derives an output at its output side in synchronism with the gate pulse $C_{10}$, which output is applied to one of input terminals of the AND gate 11. The output signal in this case is synchronized with the signal $T_{10}$, which is the output from the counter 1. Next, the shift register 13 is constructed so that its output flows in a feedback loop: [output terminal of shift register 13→AND gate 14→OR gate 12→input terminal of shift register 13], and the shift register 13 is shifted with the clock pulses CP, and the input information thereto is circulated with a constant period and stored. For applying the aforesaid signal to the shift register 13, the circuit formed by the AND gate 8 and the OR gates 7 and 9 provides timing pulses from the OR gate 9 and one of the output signals therefrom is applied via the inverter 10 to the AND gate 14 to close it. The other output signal is applied to the AND gate 11 to open it, by which the signal applied from the flip-flop 40 is fed via the OR gate 12 to the shift register 13. Since this input timing is determined by the signals $t_1$ and $t_2$ as mentioned above, the storage position in shift register 13 is also fixed and the output therefrom is provided at the timings of the signals $t_1$ and $t_2$ after one period. In this case, for the synchronization of the input to the shift register 13 with the output therefrom, the storage capacity of the shift register 13 is set to be equal to steps $t_1$ to $t_n$ of one period of the decoder 3. By the above, the CO line signal $t_9'$ applied from the key telephone set is converted to signals of the timings $t_1$ and $t_2$, and only the signal $t_1$ is utilized by a pulse of the timing of the signal $C_1$ in the AND gate 15 and is applied to gate terminals of the time-division switches 16 and 20. The signal $C_1$ is the output from the first stage of the counter 1.

By the above operation, the time-division switches 21 and 22 provided in the CO line circuit 100 and the time-division switches 16 and 20 in the subscriber's circuit 200 are opened at the same timing to enable a call between the CO line and the telephone set via the following path. That is, a transmission signal from the CO line excites the transformer 25 and, by the output therefrom, a speech current flows via a path [secondary winding 25-2 of transformer 25→hybrid 24→time-division switch 21→talking bus B→time-division switch 16→low-pass filter 17→hybrid 18→primary side 19-1 of transformer 19→ground E] to excite the transformer 19 and, by the output therefrom, a speech current flows via a path [secondary (upper) winding 19-2 of transformer 19→cable 38→hook switch 30→talking circuit 29→cable conductor 39→secondary (lower) winding 19-3 of transformer 19→power source 35] and is received by the telephone set. In a case of a transmission signal from the key telephone set, the transformer 19 is excited via the same path as mentioned above and, by the output therefrom, a taling current flows via a route [primary winding 19-1 of transformer 19→hybrid 18→time-division switch 20→talking bus A→time-division switch 22→filter 23 →hybrid 24→secondary winding 25-2 of transformer 25→ground E] to excite the transformer 25 and the signal is induced in the primary winding of the transformer 25 and sent out to the CO line.

The signals in the talking buses A and B are pulse-amplitude modulated. In FIG. 2, the CO line circuit, the subscriber's circuit and the telephone set are each shown to be one but, in practice, pluralities of CO line circuits, subscriber's circuits and key telephone sets are connected in parallel via terminals of the talking buses A and B which from one part of the data highway DH, as depicted in FIG. 1. Now, let it be assumed that five circuits are connected in parallel to the talking buses A and B. In this instance, the gate pulse to the gate of the time-division switch is determined as $t_1$ (in a case of the circuit 100), $t_3$, $t_5$, $t_7$, $t_9$. The OR gate 7 and the AND gate 8 are provided for each CO line and signals corresponding to the input signals $t_1$ and $t_2$ to the OR gate 7 and the input signal $T_{10}$ to the AND gate 8 are determined to be $t_1$, $t_2$; $t_3$, $t_4$; $t_5$, $t_6$; $t_7$, $t_8$; $t_9$, $t_{10}$; and $T_{10}$, $T_{11}$, $T_{12}$, $T_{13}$, $T_{14}$ respectively corresponding to the aforesaid CO line circuit gate pulses $t_1$ to $t_9$, and the circuits therefor are all connected to the OR gate 9. In this state, when another CO line is selected and the pulse $T_{10}'$ is received from the key telephone set, the same operations as described above are performed to enable a call for the CO line circuit assigned the gate pulse $t_1$.

In the manner described above, a call for a desired CO line is enabled by the selective actuation of the CO line selecting keys of the key telephone set. In FIG. 2, subscriber's circuits are connected in parallel with the talking buses A and B but, in this case, the call for a desired CO line is enabled by the same operation as the circuit 200.

In the above description, the time slots of the time-division switch are determined such as $t_1$, $t_3$, $t_5$, ..., and the storage capacity of the shift register 13 is selected to be twice the capacity required so that time slots are allocated every other bit, by which the crosstalk characteristic at the time of the talking path switching is improved. However, it is also possible to use the overall storage capacity in succession instead of using it every other bit so as to reduce the storage capacity.

The above description does not make any reference to the methods of synchronization of the clock $t_1$ with the clock pulse generator 26 and the counter 1 with the counter 27, but since known methods can be employed for such purposes, no description is given herein.

The above embodiment has been described with regard to the case of the shift register being used, but it is also possible to replace the shift register by a delay line memory or a random access memory, which is program-controlled by a processor or the like to be used as a circulating memory which performs the same operation as above mentioned.

Figure 4:
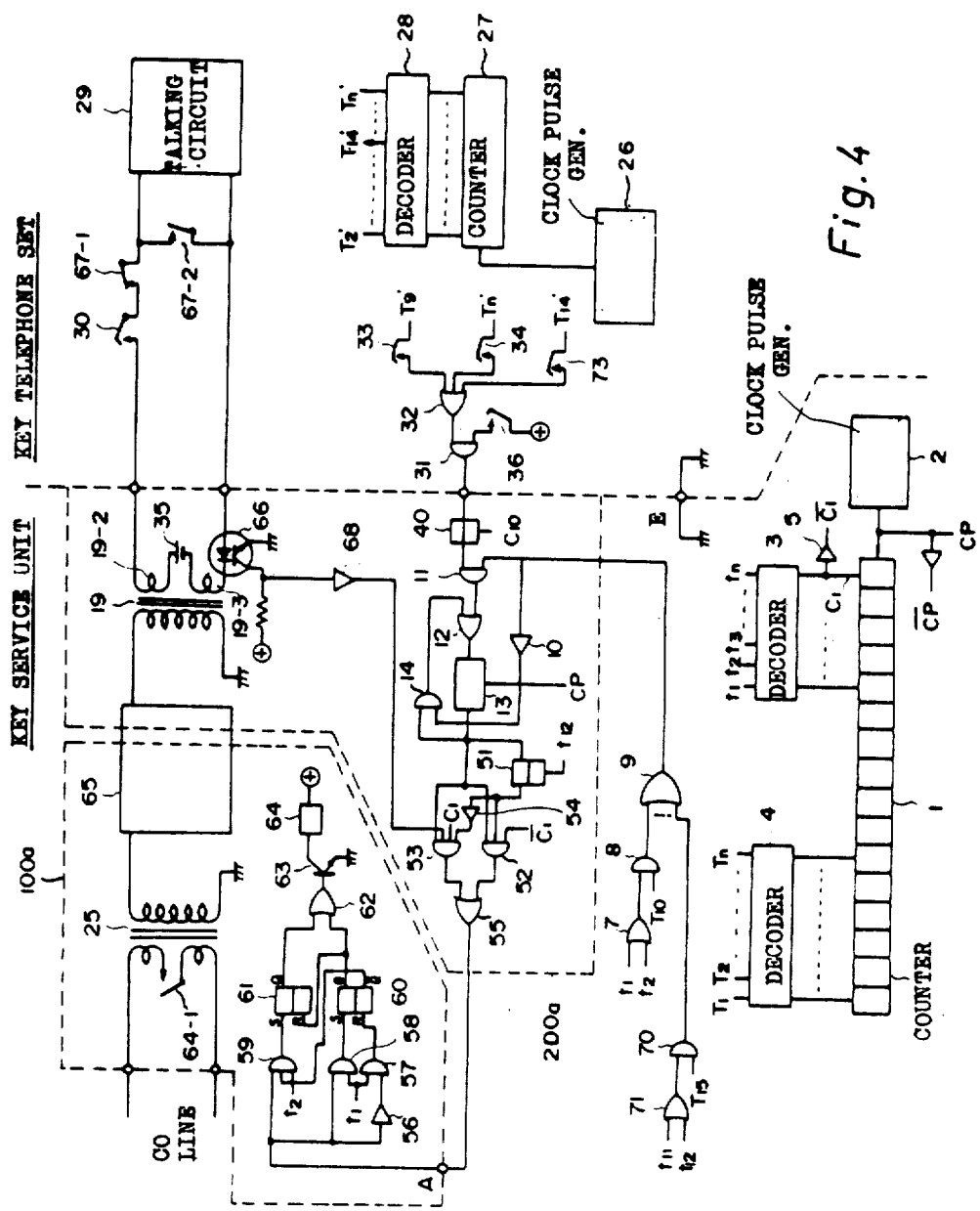
FIG. 4 is a circuit diagram explanatory of CO line seizure and holding in the key telephone set to which this invention is applied.

Turning now to FIG. 4, a description will be made in connection with the CO line seizure operation in this invention. FIG. 4 is different from FIG. 2 in that, in FIG. 4, the detailed circuit structure of the circuit 62 in FIG. 2 is not shown and circuits 51 to 71 are added. In FIG. 4, reference numerals 1 and 27 indicate counters; 2 and 26 designate clock pulse generators; 3, 4 and 28 identify decoders; 5, 10, 54, 56 and 68 denote inverters; 8, 11, 14, 15, 31, 52, 53, 57, 58, 59 and 70 represent AND gates; 7, 9, 12, 32, 55, 62 and 71 show OR gates; 13 refers to a shift register; 19 and 25 indicate transformers; 19-2 and 19-3 designate secondary windings of the transformer 19; 29 identifies a key telephone set talking circuit; 30 and 36 denote hook switches; 33 and 34 represent contacts or CO line selecting keys; 73 shows a contact of a holding key; + refers to the plus (+) terminal of the power source; E indicates the minus (−) side of the power source; 40, 51, 60 and 61 identify flip-flop circuits; 63 denotes a transistor; 64 represents a relay; 64-1 shows a contact of the relay 64; 66 refers to a photo coupler; and 67-1 and 67-2 indicate dial contacts.

The application of CO line seizure information from the key telephone set to the shift register 13 for seizing a CO line is achieved in the same manner as the foregoing.

The output from the AND gate 53, obtained as a result of the above operation, is applied via the OR gate 55 to the AND gate 58, which permits the passage therethrough of only the output of the timing $t_1$ to set the flip-flop 60. At the timing $t_1$, if the input to the inverter 56 is at the low level (that is, no signal input is applied), the flip-flop 60 is reset. Accordingly, only while the key 33 is being depressed to apply the pulse $T_9'$ from the key telephone set repetitionally with the period of the counter 27 to derive the output from the shift register 13, the flip-flop 60 is retained in its set state, and upon cutting off of the abovesaid signal, the flip-flop is reset. By setting of the flip-flop 60, it provides an output at its output terminal to turn ON the emitter-collector path of the transistor 63 via the OR gate 62, by which the relay 64 is activated to make its contact 64-1.

Thus, a DC loop is formed for the CO line to seize it. FIG. 4 illustrates the case of using one CO line and one key telephone set, but if a plurality of circuits 100a are connected in parallel to the point A in FIG. 4 and if the input signal $t_1$ to the AND gates 57 and 58 are changed to $t_1$, $t_3$, $t_5$, $t_7$, $t_9$, etc., respectively, a plurality of CO lines can be selectively seized.

In a case of using a plurality of key telephone sets, a plurality of circuits 200a are connected in parallel to the point A.

Next, a description will be given with regard to the operation of a method of transmitting dial impulse information from the key telephone set to the CO line. Dial contact information in the key telephone set is obtained by detecting a change in the next loop current by the photo coupler 66 in the key service unit. At first, a DC current intermittently applied to the input side of the photo coupler 66 via a path [(+) terminal of power source 35→secondary winding 19-2 of transformer 19→hook switch 30→dial contact (impulse contact) 67-1→dial contact (shunt contact) 67-2→input side of photo coupler 66→secondary winding 19-3 of transformer 19→(−) terminal of power source 35] due to the make operation of the contact 67-2 and intermittent operation of the contact 67-1 by the dial operation. Owing to the resulting change in the current, dial information is provided at the output side of the photo coupler 66, and the output signal is applied via the inverter 68 to the AND gate 53 to control it. As a result of this, the AND gate 53 derives at its output the logical product of the output signal from the shift register 13 and the photo coupler 66 and, by the same operation as described above, the output from the AND gate 53 sets or resets the flip-flop 60 via the circuit of the OR gate 55, the AND gates 57 and 58 and the inverter 56.

In this case, the period of the decoder 3 is set to be sufficiently smaller than the intermittent period of the contact 67-1. This is to ensure that when the contact 67-1 breaks immediately after the timing $t_2$ to drop the output from the inverter 68 to the low level, the flip-flop 60 is still retained in its set state until arrival of the pulse $t_2$ after the next one period. As a result, there is produced an error corresponding to one period of the decoder 3 at maximum. The above-said condition is necessary for reducing the error, and the period of the decoder can be determined regardless of the transmission line between the key telephone set and the key service unit, and hence can be selected sufficiently small.

The above has described the operation of seizing the CO line. The following will describe an operation of holding the CO line by actuating the holding key in the key telephone set after the CO line seizure operation. Holding information from the key telephone set is sent out in the same manner as the CO line seizure information. Upon depression of the holding key in the abovesaid state of the CO line being seized, its contact 73 makes to permit the passage therethrough of the signal $T_{14}'$ from the decoder 28 to the shift register 13 via the same path as mentioned above. At this time, the time slots for the input to the shift register 13 are $t_1$ and $t_2$. Next, the output signal from the shift register 13 sets the flip-flop 51 at the timing of the pulse $t_{12}$. The flip-flop 51 is of the same type as the flip-flop 40. Accordingly, the flip-flop 51 produces an output of the high level during one period from the timing $t_{12}$ to the next one $t_{12}$. By this output and the output from the shift register 13, the output of logical product of the CO line seizure information of the timing $t_2$ and the timing $\overline{C_1}$ of the counter 1, that is, the AND gate 52 is applied to the input of the AND gate 59 via the OR gate 55 and the point A (transmission bus). On the other hand, upon arrival of the abovesaid holding information, the output which has been provided from the AND gate 53 until then is inhibited by the inverter 54. Accordingly, the flip-flop 60 is reset to receive no input at its reset terminal R. Moreover, an output is derived at an output terminal $\overline{Q}$ of the flip-flop 60 and applied to the AND gate 59 together with the signal from the point A and the pulse $t_2$ to derive an output from the AND gate, which output is applied to the flip-flop 61 to set it. The output Q from this flip-flop 61 is supplied via the OR gate 62 to the transistor 63 to turn it ON. As a result, the relay 64 is driven to make its contact 64-1, thus holding the CO line.

The keys 33, 34 and 73 of the key telephone set are interlocking keys usually employed in the past; namely, they are constructed so that when the CO line selecting key is depressed, the holding key is locked and that when the holding key is depressed and released to be restored, the CO line selecting key is also restored. Accordingly, upon releasing the holding key, the CO line and holding keys are restored to break the contact 33 and 73 and cut off the input to the shift register 13 to clear it. Consequently, the flip-flop 60 is reset, and the flip-flop 61 continues to be in its set state.

Upon depressing the CO line selecting key again, the contact 33 makes, and the same operations as those in the case of the CO line seizure are carried out to set the flip-flop 60, the output from which is applied to the flip-flop 61 to reset it, thus releasing the CO line holding operation.

Figure 5:
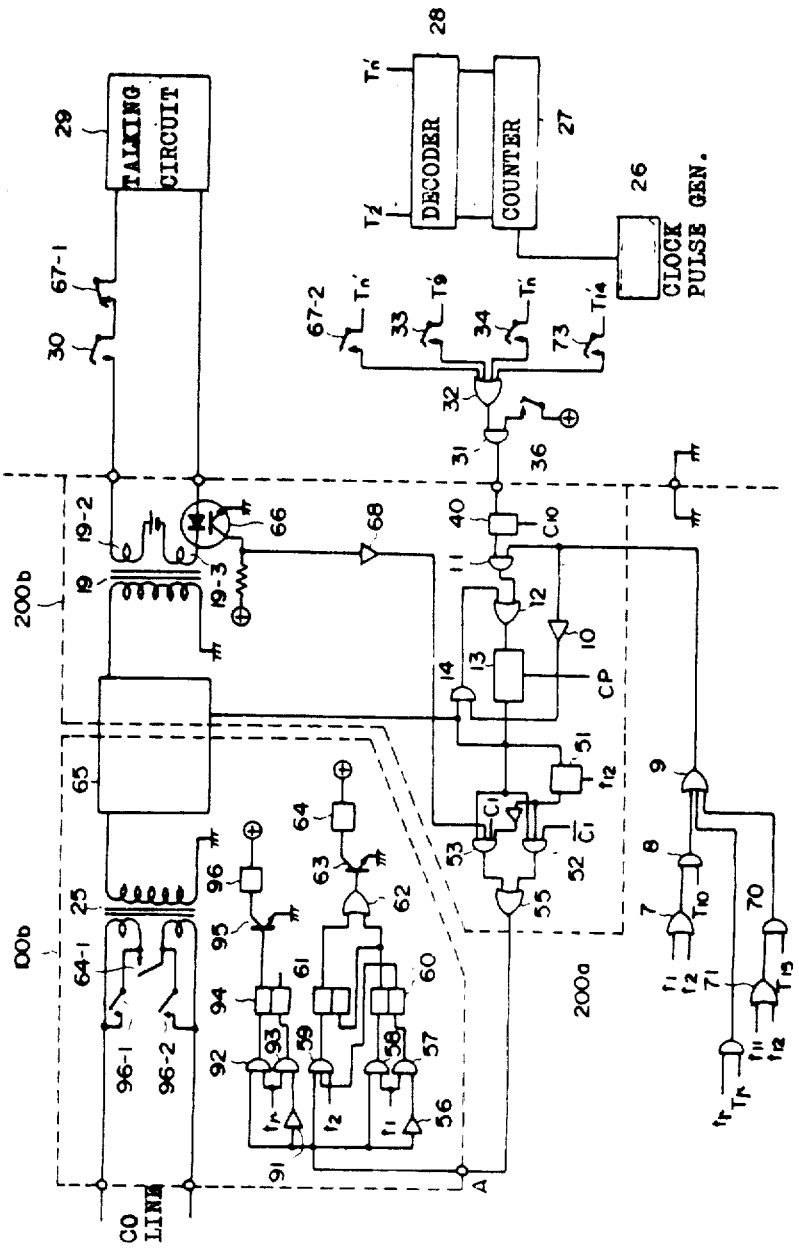
FIG. 5 is a circuit diagram illustrating a modified form of the circuit depicted in FIG. 4.

The above has described the operations of a call for the CO line, seizure and holding of the CO line. The CO line seizure method set forth above can be employed not only for seizing the CO line but also for removing the influence of the inductance of the primary winding of the transformer 25 in a case of transmitting other information, for example, information of the short-circuit contact 67-2 of the dial to the CO line, that is, during the dial impulse transmission. An example of the circuit therefor is shown in FIG. 5. The circuit structure of FIG. 5 is different from that of FIG. 2 in that the counter 1, the clock pulse generator 2 and the decoders 3 and 4 are left out of FIG. 2, in that an inverter 91, AND gates 92 and 93, a flip-flop 94, a transistor 95 and a relay 96 having contacts 96-1 and 96-2 are added and in that the contact 67-2 is inserted at a position different from that in FIG. 2. In FIG. 5, when the dial is turned, its contact 67-2 makes, and the same operations as those described above in respect of FIG. 4 are achieved. That is, information of the abovesaid contact is stored in the shift register 13 at the timing $t_p$ and read out at the same timing, and this output applies a voltage to the base of the transistor 95 via a path [AND gate 53→OR gate 55→AND gate 92→flip-flop 94→base of transistor 95] to turn ON the transistor, by which the relay 96 is activated to make its contacts 96-1 and 96-2, thus short-circuiting the primary winding of the transformer 25. This ensures to remove the influence of the inductance of the transformer 25 in the dial impulse transmission.

Figure 6:
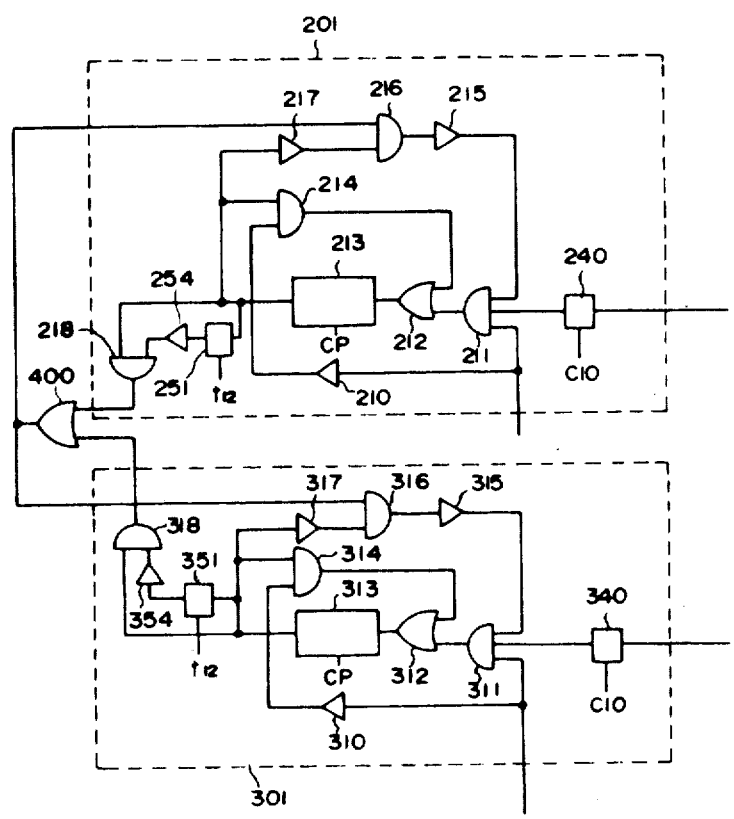
FIG. 6 is a ciruit diagram explanatory of the privacy function of the key telephone system to which this invention is applied.

Next, the privacy function of the system of this invention will hereinunder be described. FIG. 6 illustrates an example of a privacy circuit which is used with the system of this invention. The circuit structure of FIG. 6 is different from that of FIG. 2 in the following points. In FIG. 6, the circuit which is formed by the shift register 13, the AND gates 11 and 14, the OR gate 12, the inverter 10 and the flip-flop 40, and which forms one part of the circuit 200 in FIG. 2, is identified as a circuit 201, which is similarly composed of a shift register 213, AND tates 211 and 214, an OR gate 212, an inverter 210 and a flip-flop 240, and AND gates 216 and 218 and inverters 215 and 254 and a flip-flop 251 are added. A circuit 301 is identical with the circuit 201. Reference numeral 400 indicates a OR gate.

The circuit of FIG. 6 operates as a privacy circuit in the following manner. When a CO line selecting key $LK_1$ is depressed in the key telephone set connected to the circuit 201 for calling the CO line in a case of the CO line being idle CO line selecting information $LK_1$ is applied to the shift register 213 for storage, as described previously in connection with FIG. 2. In this instance, the talking operation through the circuit 201 is enabled. Next, when the CO line selecting key $LK_1$ is depressed in a key telephone set connected to the circuit 301 for calling the CO line in the abovesaid state, a signal corresponding to the information $LK_1$ is supplied to a flip-flop 340 to set it, and its output is provided to one input of an AND gate 311, as set forth previously with respect to FIG. 2. Since the information stored in the shift register 213 is read out at the timings $t_1$ and $t_2$, as mentioned above, the output is applied to another input of the AND gate 311 via a path [AND gate 218→OR gate 400→AND gate 316→inverter 315] in such a manner as to inhibit the signal from the flip-flop 340. The inverter 217 and the AND gate 216 prevent the AND gate 211 from being inhibited by the output signal from the shift register 213. Accordingly, the input to the shift register 313 is prevented, and no talking operation is enabled. In this state, the flip-flop 251 and the shift register 313 do not provide any outputs, but the inverters 254 and 354 produce outputs.

With the above operations, only the key telephone set which seizes the CO line earlier than any others when the CO line is idle, is permitted to call the CO line.

In the above state, only one key telephone set is connected to one CO line. In practice, however, there are times when it is desired to connect two or more key telephone sets to the CO line.

Now, a method for realizing it with the system of this invention will be described. Upon depression of a key HK provided on the key telephone set in FIG. 6, its contact HK makes, and the signal $T_{14}'$ is applied to the key service unit and stored in the shift register 213 at the timings shown in FIG. 3(5) and (6) in the same manner as described previously. The information of the contact HK stored in the shift register 213 is read out therefrom at the timings $t_{11}$ and $t_{12}$ to set the flip-flop 251. The flip-flop 251 is a D flip-flop, which is set by the trigger pulse $t_{12}$. The flip-flop 251 provides an output, which is applied via the inverter 254 to the AND gate 218 to inhibit the passage therethrough of the output signal from the shift register 213. Thus, the output signal from the OR gate is removed, and the CO line selecting information LK can be applied to the shift register 313. With the above operation, two or more key telephone sets can be connected to one CO line.

The present invention has been described in connection with the case where the CO line is a subscriber's line connected to an exchange station, but the invention is also applicable to an extension of a private branch exchange, regarding it as the aforesaid CO line.

As has been described in detail in the foregoing, this invention enables marked reduction of the number of cable conductors for interconnecting the key service unit and the key telephone sets of the key telephone system in which a large number of cable conductors have heretofore been used. Hence, this invention is of great practical value to saving of resources, reduction of the cost and enhancement of reliability.

Figure 7:
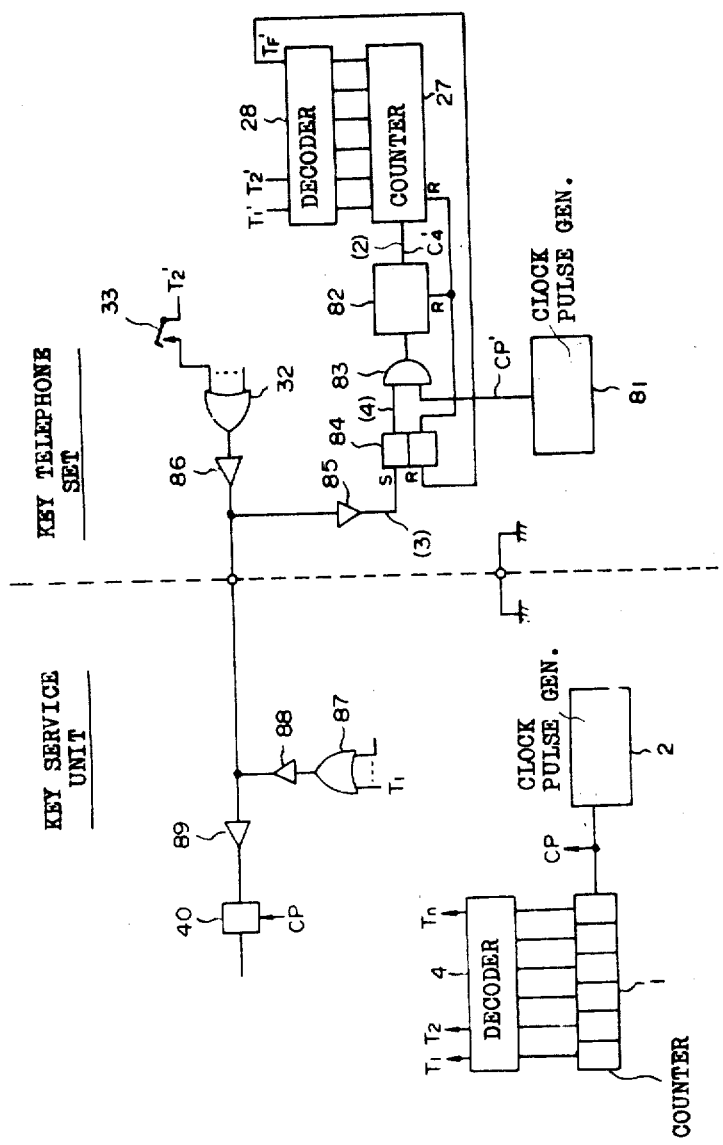
FIG. 7 is a circuit diagram explanatory of another embodiment of this invention.

With reference to FIG. 7, the synchronization operation in this invention will hereinafter be described in detail.

In FIG. 7, reference numerals 1, 27 and 82 indicate counters; 2 and 81 designates clock pulse generators; 4 and 28 identify decoders; 83 denotes an AND gate; 84 and 40 represent flip-flops; 85, 86, 88 and 89 show inverters; 32 and 87 refer to OR gates; and 33 indicates key contacts.

In the operation of the circuit shown in FIG. 7, the counter 1 is driven by a first clock pulse CP derived from the first clock pulse generator 2 to obtain pulses of a first synchronizing pulse train $T_1$ at the output side of the decoder 4 connected to the output of the counter 1. These pulses are applied via first transmitting means of a path [OR gate 87→inverter 88→inverter 85] to the set terminal S of the flip-flop 84 to set it. Upon setting of the flip-flop 84, the AND gate 83 is opened, and a second clock pulse CP' of the second clock pulse generator 81 is counted by the counter 82, and a carry pulse therefrom is applied as a counting pulse to the counter 27 to derive a second synchronizing pulse train $T_2 \ldots T_n$ from the decoder 28 connected to the output of the counter 27. Then the counter 27 has completed required counting, for example, full-scale counting, the flip-flop 84' and the counters 82 and 27 are reset by an output $T_f'$ from the decoder 28 at that time.

Figure 8:
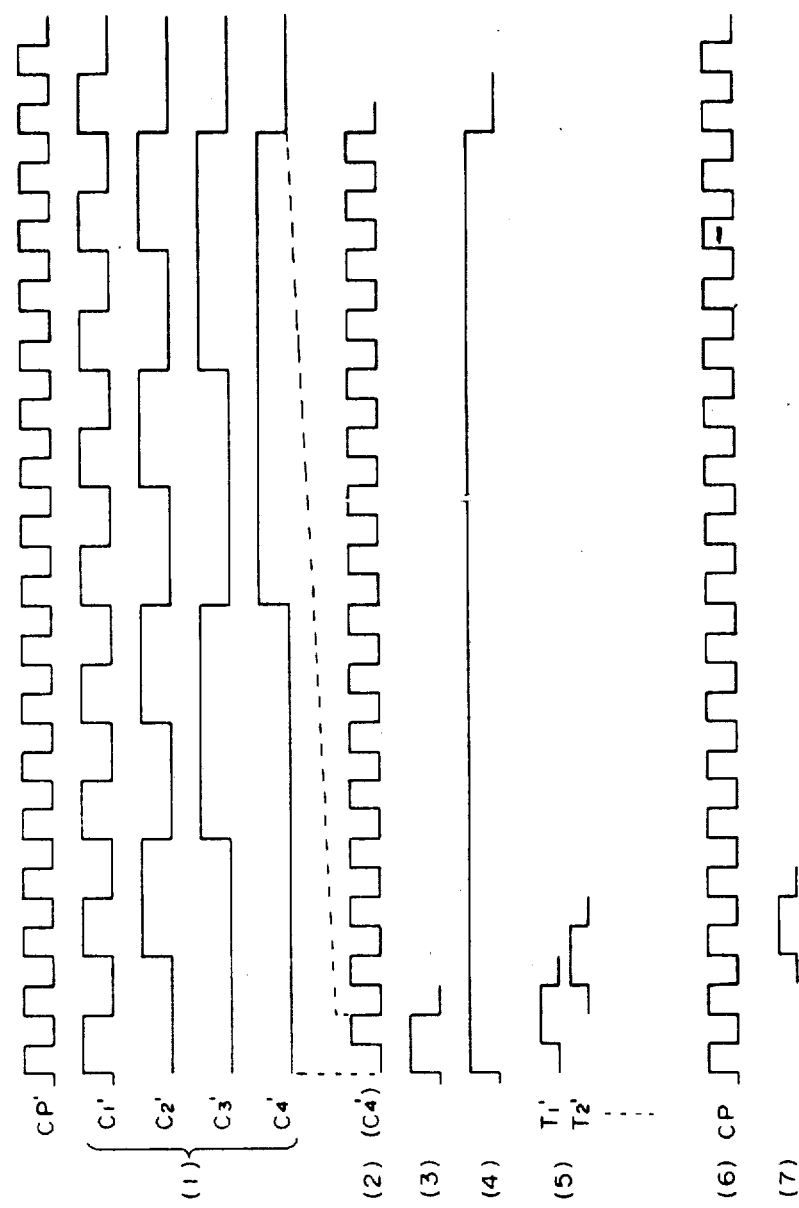
FIG. 8 shows time charts explanatory of the operation illustrated in FIG. 7.

The above operations will be described in connection with a timing chart of FIG. 8. Reference character CP' indicates the output from the clock pulse generator 81; and $C_1'$, $C_2'$, $C_3'$ and $C_4'$ in FIG. 8(1) respectively designate outputs from first to fourth stages of the counter 82 formed with a four-stage binary counter for counting the output CP'. Next, upon arrival of a synchronizing pulse (in response to an output signal $T_1$ from the decoder (4) from the key service unit, the flip-flop 84 is set, as shown in FIG. 8(4), to open the AND gate 83, so that the counter 82 is driven by the output CP' and the counter 27 also starts counting. Outputs $T_1'$, $T_2'$, ... which are derived from the decoder 28 at this time are shown in FIG. 8(5).

Next, the output signal $T_2'$ obtained from the decoder 28 by the above operation is applied by making the contact of the key 33 to an input terminal of the flip-flop 40 via a path [$T_2'$→contact 33→OR gate 32→inverter 86→inverter 89]. The flip-flop 40 is a D flip-flop and is set at the rising edge of the gate signal CP. That is, the output $T_2'$ shown in FIG. 2(5) is applied as an input signal to the flip-flop 40, and its gate is triggered by the signal CP depicted in FIG. 8(6), providing an output shown in FIG. 8(7). As a result of this, the output signals $T_1 \ldots T_n$ from the decoder 4 and the output from the flip-flop 40 which arrives from the key telephone set, are completely synchronized with each other.

The repetition period of the clock pulses CP from the clock pulse generator 2 and the repetition period of the clock pulses CP' from the clock pulse generator 81 are selected to have a constant relationship to each other. That is, the period of the clock pulse CP is selected to be larger than that of the clock pulse CP' by the frequency-dividing ratio of the counter 82, and these periods are set to be highly accurate.

Due to a phase difference between the clock pulses CP of the clock pulse generator 2 and the clock pulses CP' of the clock pulse generator 81, an error is caused between the outputs $T_1 \ldots T_n$ and $T_1' \ldots T_n'$ by the frequency-dividing ratio of the counter 82 at maximum, but this is alleviated by setting the frequency-dividing ratio to be large.

As has been described in the foregoing, this invention is to provide easy and simple means for the synchronizing system of a control signal between the key service unit and the key telephone set which has been an obstacle to the reduction of the number of cable conductors of the prior art key telephone system, and is very effective for the realization of the key telephone system employing the time division control technique.

What is claim is:

1. A key telephone system, in which a key service unit comprises a spatially divided temporary storage means for temporarily storing CO line seizure information under control of time slots designated in correspondence to a plurality of CO lines, closing means for forming a DC closed loop in respect of a seized one of the CO lines by an output from the storage means, a plurality of circulating memories provided in correspondence to a plurality of key telephone sets, and first pulse generating means for generating a clock pulse train, in which second pulse generating means is provided in each of the plurality of key telephone sets for deriving output pulses synchronized with pulses of the clock pulse train from the first pulse generating means, control information sending means provided in each of the plurality of key telephone sets for producing control information for the CO line selection by the output from the second pulse generating means and a CO line selecting key, in which write means is provided in the key service unit for receiving and detecting the control information to write the control information in a selected one of the circulating memories at an address designated by the result of the detection; and in which the output from the circulating memory is applied to the temporary storage means, thereby to seize that one of the plurality of CO lines designated by the actuation of the CO line selecting key in each of the key telephone sets.

2. A key telephone system according to claim 1, in which said control information between the key service unit and a plurality of key telephone sets are transmitted in a time-division manner; in which the key service unit comprises said first pulse generating means for generating a first clock pulse train, a synchronizing signal generator for generating at least one first synchronizing pulse train synchronized with the first clock pulse train at a predetermined timing, and first transmitting means for transmitting the first synchronizing pulse train to the key telephone set; in which each of the key telephone sets comprises said second pulse generating means for generating a second clock pulse train having a period shorter than that of the first clock pulse train, a frequency divider for counting pulses of the second clock pulse train, starting means for starting the frequency divider in response to the synchronizing pulse train, and second transmitting means provided in said control information sending means for transmitting from the key telephone set to the key service unit at least one second synchronizing pulse train synchronized with an output pulse from the frequency divider; and in which the frequency dividing ratio of the frequency divider is set so that the period of the output from the frequency divider and the period of the first clock pulse train may coincide with each other, thereby to synchronize the first and second synchronizing pulse trains with each other.

3. A key telephone system according to claim 2, in which the starting means includes a flip-flop circuit which is set in response to the first synchronizing pulse transmitted by the first transmitting means and reset in response to a pulse obtained by frequency dividing the output pulse from the frequency divider.

4. A key telephone system according to claim 2, in which the second transmitting means includes a D flip-flop which receives the second synchronizing pulse train as an input and the first clock pulse train as a trigger input.

5. A key telephone system, in which each of a plurality of key telephone sets is connected to a selected one of a plurality of CO lines by the use of a selected one of a plurality of talking lines under control of a key service unit and a plurality of control lines; in which the key service unit comprises a first pulse generator for generating clock pulses, a high-speed pulse train of modulation-demodulation high-speed time slots successively assigned to the CO lines and a low-speed pulse train of control signal transmitting low-speed time slots successively assigned to the plurality of CO lines, a plurality of circulating memories respectively corresponding to the plurality of key telephone sets, a plurality of write means, each provided in correspondence to one of the plurality of key telephone sets for writing a control output transmitted thereto from the corresponding key telephone set through one of the control lines in a corresponding one of the plurality of circulating memories in synchronism with an AND output of a corresponding one pulse of the control signal transmitting low-speed pulse train and a corresponding one pulse of the modulation-demodulation high-speed pulse train, a plurality of bistable circuits, respectively corresponding to the plurality of CO lines, a plurality of closing means, each provided in correspondence to one of the plurality of the CO lines for closing the corresponding CO line when a corresponding one of the bistable circuits is in a predetermined state, a plurality of first gate means, respectively corresponding to the plurality of CO lines for reading out the content of a corresponding one of the circulating memories in synchronism with a corresponding one of the modulation-demodulation high-speed time slots to put a corresponding one of the bistable circuits in the predetermined state with the output read out of the circulating means; a plurality of talking current supply means, each corresponding to one of the plurality of key telephone sets and connected to one of the plurality of talking lines, a plurality of talking current detecting means, each corresponding to one of the plurality of key telephone sets and inserted in one of the plurality of talking lines for detecting the presence of a talking current flowing in the talking line, and a plurality of second gate means, each connected between a corresponding one of the plurality of circulating memories and a corresponding one of the plurality of first gate means in corresponding to one of the plurality of key telephone sets and controlled by a detected output from the talking current detecting means having detected the interruption of the talking current due to an ON-OFF control operation of a dial contact of the corresponding key telephone set; in which each of the plurality of key telephone sets comprises a second pulse generator for generating synchronizing time slot pulses substantially synchronized with a corresponding one of the control signal transmitting low-speed time slots, actuating means including a plurality of CO line selecting keys respectively corresponding to the plurality of CO lines, and control output means for deriving the control output from the corresponding key telephone set by an AND output of the output from the actuating means and the synchronizing time slot pulses; and in which one of the plurality of CO lines designated by the control output sent out by the actuation of the CO line selecting key in a desired one of the plurality of key telephone sets is closed.

6. A key telephone system, in which each of a plurality of key telephone sets is connected to a selected one of a plurality of CO lines by the use of a selected one of a plurality of talking lines under control of a key service unit and a plurality of control lines; in which the key service unit comprises a first pulse generator for generating clock pulses, a high-speed pulse train of modulation-demodulation high-speed time slots successively assigned to the CO lines and a low-speed pulse train of control signal transmitting low-speed time slots successively assigned to the plurality of CO lines, a plurality of circulating memories respectively corresponding to the plurality of key telephone sets, a plurality of write means, each provided in correspondence to one of the plurality of key telephone sets for writing a control output transmitted thereto from the corresponding key telephone set through one of the control lines in a corresponding one of the plurality of circulating memories in synchronism with an AND output of a corresponding one pulse of the control signal transmitting low-speed pulse train and a corresponding one pulse of the modulation-demodulation high-speed pulse train, a plurality of bistable circuits, respectively corresponding to the plurality of CO lines, a plurality of closing means, each provided in correspondence to one of the plurality of the CO lines for closing the corresponding CO line when a corresponding one of the bistable circuits is established in a predetermined state, and a plurality of first gate means, respectively corresponding to the plurality of CO lines for reading out the content of a corresponding one of the circulating memories in synchronism with a corresponding one of the modulation-demodulation high-speed time slots to establish a corresponding one of the bistable circuits in the predetermined state by the output read out of the circulating means; in which the plurality of key telephone sets each comprises a second pulse generator for generating synchronizing time slot pulses substantially synchronized with a corresponding one of the control signal transmitting low-speed time slots, and control output means for deriving the control line output from the key telephone set by an AND output of an output from a short-circuit contact of a dial and the synchronizing time slot pulses; in which the key service unit further comprises a plurality of coils respectively connected in series with the plurality of closing means, a plurality of third bistable circuits respectively corresponding to the plurality of CO lines, a plurality of short-circuit means, each provided in correspondence to one of the plurality of CO lines for short-circuiting one of the coils respectively corresponding to the one CO line when one of the plurality of third bistable circuits respectively corresponding to the short-circuit means is established in a predetermined state, and a plurality of fourth gate means, each provided in correspondence to one of the plurality of CO lines for reading out the content of a corresponding one of the plurality of circulating means in synchronism with a corresponding one of the plurality of trains of modulation-demodulation high-speed time slot pulses to establish a corresponding one of the plurality of third bistable circuits into the predetermined state, whereby the coil is short-circuited during the dial impulse transmission in a desired one of the plurality of key telephone sets.

7. A key telephone system, in which each of a plurality of key telephone sets is connected to a selected one of a plurality of CO lines by the use of a selected one of a plurality of talking lines under control of a key service unit, and a plurality of control lines; in which the key service unit comprises a first pulse generator for generating clock pulses, a high speed pulse train of modulation-demodulation high-speed time slots successively assigned to the CO lines and a low-speed pulse train of control signal transmitting low-speed time slots successively assigned to the CO lines, a plurality of first time-division switches respectively connected to the CO lines and controlled by pulse trains respectively corresponding to the plurality of trains of modulation-demodulation high-speed time slot pulses, a plurality of second time-division switches respectively connected to the talking lines in correspondence to the plurality of key telephone sets and controlled by pulse trains respectively corresponding to the modulation-demodulation high-speed time slots, a plurality of circulating memories respectively corresponding to the key telephone sets and connected at the output side to the plurality of second time-division switches, and a plurality of write means for writing a control output transmitted thereto from a corresponding one of the key telephone sets through the control line in a corresponding one of the control signal transmitting low-speed slots; in which each of the key telephone sets comprises a second pulse generator for generating synchronizing time slot pulses substantially synchronized with a corresponding one of the control signal transmitting low-speed time slots, actuating means including a plurality of CO line selecting keys respectively corresponding to the CO lines, and control output means for deriving the control output from a corresponding one of the key telephone sets by a logical product of the output from the actuating means and the synchronizing time slot pulse; and in which one of the CO lines selected by the control output sent out by the operation of the CO line selecting key in a desired one one of the key telephone sets is connected to the key telephone set in a time-division manner to enable a call for the selected CO line.

8. A key telephone system, in which each of a plurality of key telephone sets is connected to a selected one of a plurality of CO lines by the use of a selected one of a plurality of taling lines under control of a key service unit and a plurality of control lines; in which said key service unit comprises first and second spacially divided temporary storage means for temporarily storing CO line seizure information and CO line holding information in time slots respectively corresponding to a plurality of CO lines, closing means for forming a DC closed loop in respect to the CO line in response to the output from the first storage means, a plurality of circulating memories respectively corresponding to a plurality of key telephone sets, first pulse generating means for generating a clock pulse train; in which each of the plurality of key telephone sets comprises second pulse generating means for generating output pulses synchronized with pulses of the clock pulse train from the first pulse generating means, control information sending means for producing control information of CO line selection and CO line holding by the output from the second pulse generating means and the control of a CO line selecting key and a holding key; in which said key service unit further comprises write means for receiving and detecting the control information to write at least one of the CO line selection information and the CO line holding information in a selected one of the circulating memories at an address designated by the result of the detection, and switching means for outputting the CO line holding information while inhibiting the CO line selecting information when the holding information is stored in the circulating memory and outputting the CO line selecting information only when the holding information is not stored in the circulating memory and the CO line selecting information is stored; and in which the output from the switching means is applied to the first and second temporary storage means, whereby one of the plurality of CO lines designated by the CO line selecting key actuation is held by the operation of the holding key.

9. A key telephone system adapted to selectively connect each of a plurality of key telephone sets to a selected one of a plurality of CO lines by the use of a selected one of a plurality of talking lines under control of a key service unit and a plurality of control lines; in which the key service unit comprises a first pulse generator for generating clock pulses, a high-speed pulse train of modulation-demodulation high-speed time slots successively assigned to the CO lines and a low-speed pulse train of control signal transmitting low-speed time slots successively assigned to the control lines, a plurality of first time-division switches respectively connected to the plurality of the CO lines and controlled by corresponding one of the modulation-demodulation high-speed time slots, a plurality of second time-division switches respectively connected to the talking lines in correspondence to the plurality of key telephone sets and controlled by corresponding ones of the modulation-demodulation high-speed time slots, a plurality of circulating memories respectively corresponding to the key telephone sets and connected at the output side to the plurality of second time-division switches, a plurality of write means, each provided in correspondence to one of the key telephone sets for writing a control output transmitted from the corresponding key telephone set through the control line in a corresponding one of the plurality of circulating memories in synchronism with the control signal transmitting low-speed time slots, a plurality of feedback means provided in correspondence to the key telephone sets for temporarily inhibiting the writing of the control output in a corresponding one of the circulating memories while an output pulse is derived from any of the circulating memories, and a plurality of releasing means, each provided in correspondence to one of the plurality of feedback means for temporarily opening a loop of the corresponding feedback means by the output pulse from a corresponding one of the plurality of circulating memories for the duration of the output pulse; in which each of the key telephone sets comprises a second pulse generator for generating synchronizing time slot pulses substantially synchronized with a corresponding one of the control signal transmitting low-speed time slots, operation means including a plurality of CO line selecting keys respectively corresponding to the CO lines, and control output means for deriving the control output from the corresponding key telephone set by an AND output of the output from the operation means and the synchronizing time slot pulses; and in which one of the CO lines designated by the control output sent out by the operation of the CO line selecting key in a desired one of the key telephone sets is connected to the key telephone set in a time-division manner and a talking operation to the CO line is achieved in a state that the privacy of the talking content is protected from the other key telephone sets.

10. A key telephone system adapted to connect each of a plurality of key telephone sets to a selected one of a plurality of CO lines by the use of a selected one of a plurality of talking lines under control of a key service unit and a plurality of high-speed pulse train control lines; in which the key service unit comprises a first pulse generator for generating clock pulses, a high-speed pulse train of modulation-demodulation high-speed time slots respectively corresponding to the CO lines and a low-speed pulse train of control signal transmitting low-speed time slots respectively corresponding to the control lines, a plurality of first time-division switches respectively connected to the plurality of the CO lines and controlled by corresponding ones of the modulation-demodulation high-speed time slots, a plurality of second time-division switches respectively connected to the talking lines in correspondence to the plurality of key telephone sets and controlled by corresponding ones of the modulation-demodulation high-speed time slots, a plurality of circulating memories respectively corresponding to the key telephone sets and connected at the output side to the plurality of second time-division switches, a plurality of write means, each provided in correspondence to one of the key telephone sets for writing a control output transmitted from the corresponding key telephone set through the control line in a corresponding one of the plurality of circulating memories in synchronism with the control signal transmitting low-speed time slots, a plurality of feedback means provided in correspondence to the key telephone sets for temporarily inhibiting the writing of the control output in a corresponding one of the circulating memories while an output pulse is derived from any of the circulating memories, and a plurality of releasing means, each provided in correspondence to one of the plurality of feedback means for temporarily opening a loop of the corresponding feedback means with the output pulse from a corresponding one of the plurality of circulating memories for the duration of the output pulse; in which each of the key telephone sets comprises a second pulse generator for generating synchronizing time slot pulses substantially synchronized with a corresponding one of the control signal transmitting low-speed time slots, operation means including a plurality of CO line selecting keys respectively corresponding to the CO lines, and control output means for deriving the control output from the corresponding key telephone set by an AND output of the output from the operation means and the synchronizing time slots; in which one of the CO lines designated by the control output sent out by the operation of the CO line selecting key in a desired one of the key telephone sets is connected to the key telephone set in a time-division manner and a talking operation to the CO line is achieved in a state that the privacy of the talking contents is protected from the other key telephone sets; in which the key service unit further includes gate means provided between the plurality of circulating memories and the plurality of feedback means, the gate means being operated with a signal of a predetermined timing to inhibit the output signal from the corresponding circulating memory; in which each of the key telephone sets further includes second operation means such as a privacy release key for connecting the key telephone set to the CO line; and in which the gate means is actuated by the outputs from the second pulse generator and the second operation means to inhibit the output from the corresponding circulating memory, thereby enabling the connection of more than one of key telephone sets to the same CO line.

* * * * *